US006839689B2

United States Patent
Aieta et al.

(10) Patent No.: US 6,839,689 B2
(45) Date of Patent: *Jan. 4, 2005

(54) SYSTEMS AND METHODS FOR GUARANTEEING THE PROTECTION OF PRIVATE INFORMATION

(75) Inventors: Mario A. Aieta, New York, NY (US); Donald T. Beldock, Rye, NY (US); James G. Beldock, Rye, NY (US)

(73) Assignee: AGB2 Inc., Rye, NY (US)

( * ) Notice: Subject to any disclaimer, the term of this patent is extended or adjusted under 35 U.S.C. 154(b) by 736 days.

This patent is subject to a terminal disclaimer.

(21) Appl. No.: 09/671,883

(22) Filed: Jan. 10, 2001

(65) Prior Publication Data

US 2001/0010044 A1 Jul. 26, 2001

Related U.S. Application Data

(63) Continuation-in-part of application No. 09/433,013, filed on Nov. 3, 1999, now Pat. No. 6,269,349.
(60) Provisional application No. 60/154,945, filed on Sep. 21, 1999.

(51) Int. Cl.[7] .............................................. G06F 15/46
(52) U.S. Cl. ........................................ 705/51; 705/57
(58) Field of Search ............................... 705/80, 54, 1, 705/51, 57; 707/9, 103

(56) References Cited

U.S. PATENT DOCUMENTS

| 5,535,383 | A |   | 7/1996 | Gower | 395/600 |
| 5,611,048 | A | * | 3/1997 | Jacobs et al. | 713/202 |
| 5,734,718 | A | * | 3/1998 | Prafullchandra | 713/183 |
| 5,920,861 | A |   | 7/1999 | Hall et al. | 707/9 |
| 5,949,876 | A |   | 9/1999 | Ginter et al. | 380/4 |
| 5,987,440 | A |   | 11/1999 | O'Neil et al. | 705/44 |
| 6,269,349 | B1 |  | 7/2001 | Aieta et al. | 705/80 |

FOREIGN PATENT DOCUMENTS

| EP | 0 917 119 A2 | 5/1999 |
| WO | WO 98/33294 | 7/1998 |

OTHER PUBLICATIONS

US Bonding & Insurance Services, Inc., "Welcome to Bonding On–Line," www.usbonding.com, Feb. 1, 2000, 2 pages.
Verisign, Enterprise & Internet Security Solutions, www.verisign.com, Jan. 9, 2000, 36 pages.
J.S. Wurzler, "Internet's First On–Line Purchase Protection Program Liability Insurance Announced by J.S. Wurzler Underwriting Managers ", Sep. 1, 1999, 2 pages.
"New Marketer, New Feature for E–Commerce Program", Crittenden's Excess & Surplus Insider, vol. 14, No. 12, Aug. 2, 1999, 2 pages.
J.S. Wurzler, "New Internet Product Offering Protection From the Risks of E–Commerce: Wisp", May 3, 1999, 2 pages.
M. Hillebrand, "Lloyds of London Offers Anti–Hacker Insurance", E–commerce Times, May 3, 1999, 2 pages.

\* cited by examiner

*Primary Examiner*—James P. Trammell
*Assistant Examiner*—Bradley Byat
(74) *Attorney, Agent, or Firm*—Harrity & Snyder, LLP (57) ABSTRACT

A system protects private information provided in an exchange between a client and a server. The system receives the private information from the client and determines whether it is of a type for which a guarantee may be issued. The guarantee provides an indemnity for the benefit of the client for misuse of the private information. The system then issues a guarantee for the private information, if it is determined to be of the type for which a guarantee may be issued, and provides the private information to the server with a guarantee.

65 Claims, 9 Drawing Sheets

| SOCIAL SECURITY NUMBER 310 |
| --- |
| CREDIT CARD INFORMATION 320 |
| BANK ACCOUNT INFORMATION 330 |
| PIN/PASSWORD 340 |
| NAME 350 |
| ADDRESS 360 |
| TELEPHONE NUMBER 370 |
| EMAIL ADDRESS 380 |
| OTHER PRIVATE INFORMATION 390 |

SYSTEMS AND METHODS FOR GUARANTEEING THE PROTECTION OF PRIVATE INFORMATION

RELATED APPLICATIONS

This application claims priority under 35 U.S.C. § 119 based on U.S. Provisional Application Serial No. 60/154,945, filed Sep. 21, 1999, and under 35 U.S.C. § 120 as a continuation-in-part of U.S. patent application Ser. No. 09/433,013, filed Nov. 3, 1999, now U.S. Pat. No. 6,269,349, the disclosures of which are incorporated herein by reference.

BACKGROUND OF THE INVENTION

1. Field of the Invention

The present invention relates generally to privacy protection and, more particularly, to systems and methods that protect private information provided to a third party.

2. Description of Related Art

Electronic commerce ("eCommerce") has dramatically increased in recent years. Many server operators now have web sites on the Internet that users can access to seek out or research information, purchase or research goods and/or services, and communicate with other users, web sites, or services. In a typical commercial transaction, a user browses a vendor's catalog, selects a product, places an order for the product, and pays for the product, all electronically over the Internet.

In some conventional eCommerce systems, the server operator requests the user to provide confidential personal and/or corporate information, such as a name, address, telephone number, or account data, in order to proceed with the on-line transaction. The user transmits the confidential information to the server operator over the Internet. The server operator may then use the confidential information to complete the transaction.

In other conventional eCommerce systems, a growing number of transactions are performed across intranets and internets (including the Internet) by protocols or mechanisms other than the hypertext transfer protocol (http://). Such non-http-based transactions use a myriad of different protocols and languages to encode the information, including electronic data interchange (EDI), file transfer protocol (FTP), extensible markup language (XML) send and receive, standard generalized markup language (SGML), etc. Furthermore, transactions such as these use transport mechanisms with protocols other than, or built upon, transmission control protocol/Internet protocol (TCP/IP), such as internetwork packet exchange (IPX), Internet protocol security (IPSEC), Internet protocol version 6 (Ipv6), secure sockets layer (SSL), etc. Also, these non-Web-based transactions can occur as a result of interconnections between systems through a common language specified by a meta-language (e.g., specified by XML) or through direct binary communication between systems (e.g., via distributed component object model (DCOM), common object request broker architecture (CORBA), or other distributed object, procedural, or client-server architectures).

Two problems that exist in conventional eCommerce systems pose a major concern to businesses and individuals. The first problem includes the risk of invasion of privacy imposed on a user (corporate or individual) seeking goods, services, and/or information. The user may provide personal information, such as a name or credit card number, corporate information, such as a corporate name or account data, or a combination of personal and corporate information to a server operator offering these goods, services, and/or information. The user, however, has no way of knowing whether the provided information will be kept secure by the server operator and not used in a manner against his wishes. For example, the user may provide his name and telephone number as part of a standard eCommerce transaction. In some cases, the server operator sells or trades the user's information to telemarketing services without the knowledge of the user or stores the information in an insecure manner that permits access by a third party.

In the case of business-to-business transactions, information on what the business is buying, what quality and quantity, from whom, and what the business is thinking of buying (as evidenced by research and browsing habits) constitutes critical confidential information to the business. The risk of interception or misuse of this information is as great or greater than that of other types of personal or corporate information.

The second problem involves the irritating, time-consuming, and generally repetitious data entry required for a user (corporate or individual) to open a new account or use an existing one. For example, to open a new account, the user must provide private information regarding the user or the business. Some server operators will store a user's private information on their server for subsequent transactions by the user. To set up the account, however, the user must enter the information manually. To use a previously-opened account, the user must go through a tedious and mistake-fraught process and recall a password which, if the user follows security doctrines, should be unique to each site the user visits.

As a result, a need has arisen for a mechanism to insure the security of private information provided to a third party. A need has also arisen for a simplified, expedited, and automated mechanism for providing such information.

SUMMARY OF THE INVENTION

Systems and methods consistent with the present invention address these needs by facilitating the provision of private information of a client to a server in a secure, highly automated, efficient manner that imposes minimal physical burden and no uncovered risk to the client or server.

In accordance with the purpose of the invention as embodied and broadly described herein, a system protects private information provided in an exchange between a client and a server. The system receives the private information from the client and determines whether it is of a type for which a guarantee may be issued. The guarantee provides an indemnity for the benefit of the client for use of the private information in a manner unauthorized by the client. The system then issues a guarantee for the private information, if it is determined to be of the type for which a guarantee may be issued, and provides the private information to the server with a guarantee.

In another implementation consistent with the present invention, an object, accessed or executable by a client entity communicating with several server entities, protects private information of a user associated with the client entity. The executable object includes instructions for obtaining private information from the user for use in an information exchange with one of the server entities; instructions for sending the private information to an external object to obtain an assessment of whether the private information is coverable by a guarantee, the assessment indicating whether an indemnity will be paid to the user if the private information is used in a manner unauthorized by the user; instructions for obtaining the assessment from the external object; and instructions for providing the private information to the server entity with a guarantee.

In a further implementation consistent with the present invention, an object, executable by a client entity communicating with at least one server entity, protects private information provided to the server entity. The executable object includes instructions for obtaining private information from a user associated with the client entity for use in an information exchange with the server entity; instructions for assessing whether the private information is coverable by a guarantee, the assessment indicating whether an indemnity will be paid to the user if the private information is used in a manner unauthorized by the user; and instructions for providing the private information to the server entity with a guarantee.

In another implementation consistent with the present invention, a method for providing privacy in a transaction includes providing information, services, and/or products for browsing and purchase by consumers during a transaction; requesting private information from the consumers prior to completing the transaction; receiving the requested information with a guarantee, the guarantee providing an indemnity for the benefit of the consumers for misuse of the requested information; and completing the transaction.

In yet another implementation consistent with the present invention, a system facilitates the provision of private information of a client to a server during an information exchange. The system includes a memory that stores data and a processor. The processor receives a request for private information of the client from the server and generates an intended response to the request. The intended response includes the requested private information with a guarantee. The guarantee provides an indemnity for the benefit of the client for use of the private information in a manner unauthorized by the client. The system provides the intended response to the client, receives authorization from the client to send the intended response to the server, and sends the intended response to the server in response to the received authorization.

In a further implementation consistent with the present invention, a computer-implemented method securely and automatically distributes a password. The method includes receiving a password from a user; receiving a list of recipients to receive the password; encrypting the password; and distributing the encrypted password to the recipients on the list.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention insure the security of private information provided to a third party, such as a server, and facilitate the providing of such information in a simplified, expedited, and automated manner.

Exemplary System

An exemplary system consistent with the present invention includes various logical groupings of entities provided by one or more devices. An "entity" refers to a device, resource, data, or functionality that can be accessed by a user, program, device, or another entity, that can be computational, storage-related, communication-related, or related to providing access to another user. Examples of entities include software, such as application programs, threads, and processes; information, such as databases and files; objects as traditionally defined in the art, including, but not limited to, component object model (COM), COM+, or CORBA-compliant objects, or other objects that do not necessarily comply with an over-arching object model; and hardware, such as computer devices and components.

In an interaction between two entities within the exemplary system, the "client" entity requests services (directly or indirectly) from the "server" entity. The client and server entities may physically reside on a single computer or on multiple computers.

Further, the following detailed description will describe information as "personal," "private," and "confidential." These terms all refer to any information regarding a client that the client provides (explicitly or implicitly) to a server. In the description that follows, these terms may be used interchangeably.

Figure 1:
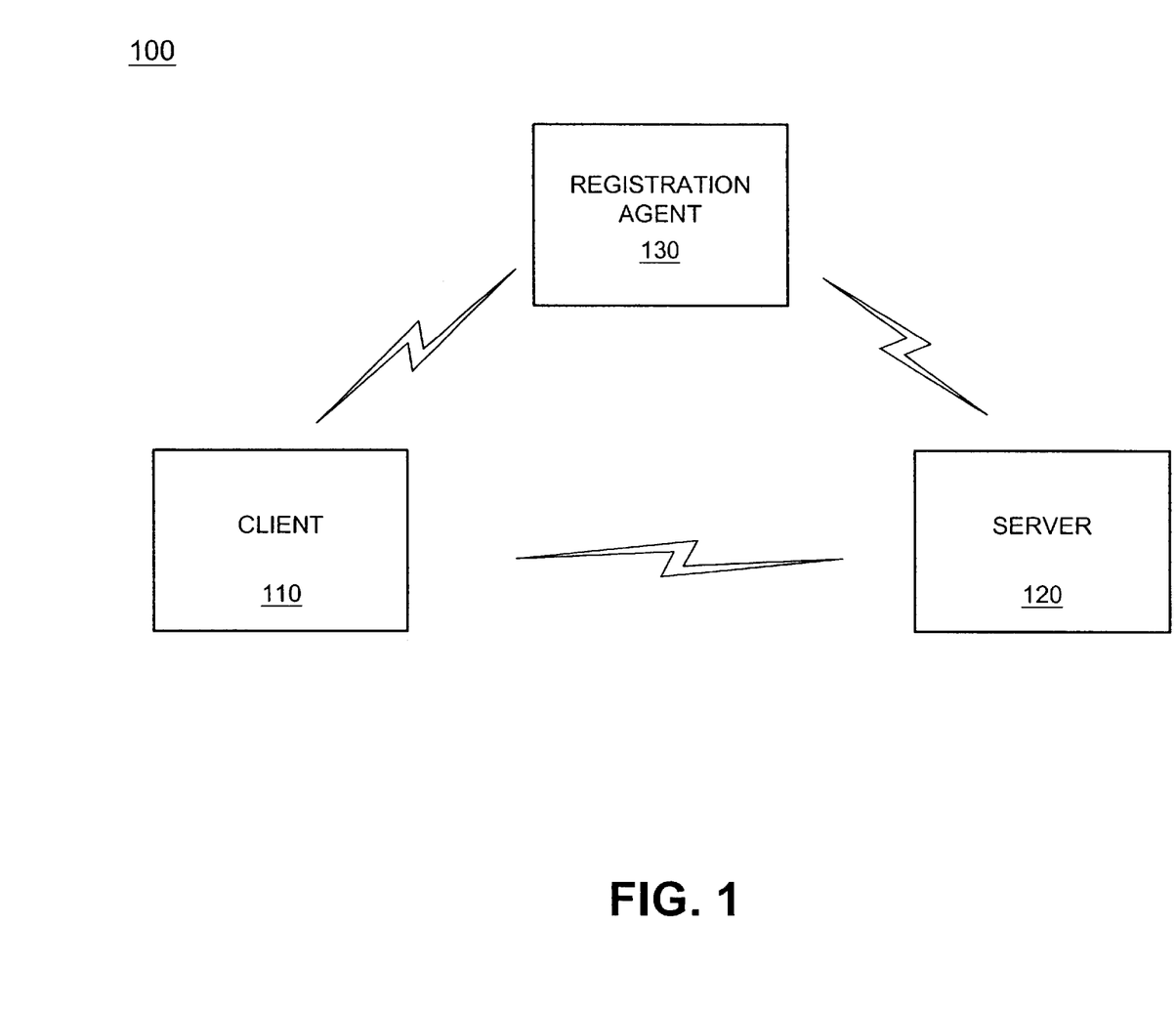
FIG. 1 is a diagram of an exemplary system consistent with the present invention.

FIG. 1 is a block diagram of the exemplary system 100 consistent with the present invention. The system 100 includes a client 110 communicating with a server 120 and a registration agent 130. The client 110, server 120, and registration agent 130 may be implemented as one or more devices and may communicate via any communications medium (e.g., by wired or wireless communication; via a network, such as the Internet; via a storage device; etc.).

The client 110 is an entity that can communicate with the server 120, such as a personal computer, a laptop, a personal digital assistant (PDA), some equivalent smart or dumb terminal, a thread or process running on one of these devices, or an object executable by one of these devices. The server 120 may include any conventional server entity. The server 120 provides goods, services, and/or information via a defined protocol (e.g., a web site or the like) for use by users associated with entities, such as client 110. A single client 110 and server 120 have been shown for simplicity. One skilled in the art would recognize that the system 100 may include any number of clients 110 and servers 120.

The registration agent 130 may include an entity that issues a guarantee to a user that provides a substantial indemnity to be paid to any user who provides private information in order to effect a transaction or derived from any transaction or any pattern of transactions authorized or carried out by such user through a registered server, such as server 120. The guarantee may take different forms. For example, in some implementations consistent with the present invention, the guarantee may include a commitment, a contract, a surety bond, or some other instrument that assures the protection of information.

The indemnity may be paid by the server whose privacy is invaded by the unauthorized use of the user's private information. The amount of the indemnity, which will likely be sufficient to attract a large percentage of potential users, may be pre-set on a category basis for each category of information, invasion of privacy, or other form of misuse of private information. For example, the amount of the indemnity may vary for misuse of a user's name as compared to misuse of the user's account information. The amount of indemnity may be set forth in support and explanatory material provided on the participating server in such a manner as to permit the server to promote the fact that the indemnity is of meaningful financial value. In such explanatory materials on the participating server, and as an element of the contract contained therein, the manner of establishing a claim by a user may be clearly set forth.

In this implementation, the client's identity and private information about that client 110 (e.g., its member variables; information associated with its human or corporate owners; its internal state, location or privileges; etc.) are protected in its interactions with a server 120 through a guarantee provided by the registration agent 130. In such an implementation, any information provided by the client 110 in response to queries from the server 120 (made either directly or as "callbacks" by the server 120) may be covered by a guarantee provided by the registration agent 130.

The registration agent 130 ultimately defines the "covered domain" (i.e., the types of information for which it will and will not issue a guarantee), though the assessment of whether information falls within the covered domain may be performed by other entities. In one implementation consistent with the present invention, the registration agent 130 announces what the covered domain includes and a server 120 may only ask questions regarding information within the covered domain, if it wishes the information protected. In another implementation, the server 120 predetermines what its covered domain will be. The covered domain of the server 120 will be the same as or a subset of the covered domain of the registration agent 130. In yet another implementation, the server 120 determines whether information falls within the covered domain on a transaction-by-transaction, client-by-client, on-the-fly basis, etc.

Figure 2:
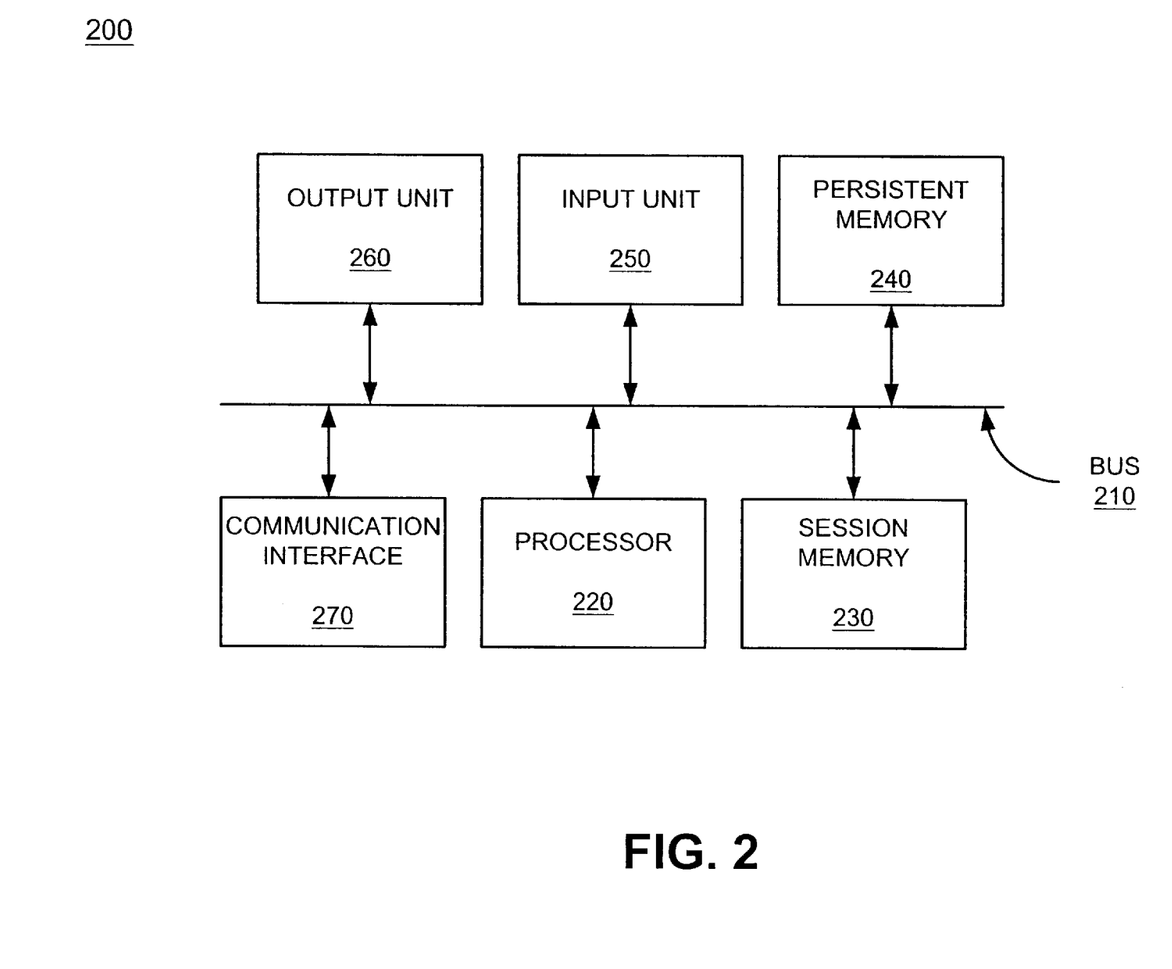
FIG. 2 is a detailed diagram of an exemplary device that may incorporate the client, server, and/or registration agent of FIG. 1.

FIG. 2 is an exemplary diagram of a device 200 that may incorporate client 110, server 120, and/or registration agent 130 in one implementation consistent with the present invention. One skilled in the art would recognize that other configurations are possible.

The device 200 includes a bus 210, a processor 220, a session memory 230, a persistent memory 240, an input device 250, an output device 260, and a communication interface 270. The bus 210 permits communication among the components of the device 200. The processor 220 may be any type of conventional processor or microprocessor that interprets and executes instructions. The session memory 230 may include a random access memory (RAM) or other dynamic storage device that stores information and instructions to be executed by the processor 220, and/or a read only memory (ROM) or other type of static storage device that stores static information and instructions for use by the processor 220. The persistent memory 240 may include a hard disk, a floppy disk, a CD-ROM, a DVD-RAM, and/or some other type of magnetic or optical recording medium and its corresponding drive.

The input device 250 may include any conventional mechanism capable of inputting information into the device 200, such as a keyboard, a mouse, a pen, voice recognition and/or biometric mechanisms, etc. The output device 260 may include any conventional mechanism capable of outputting information from the device 200, including a display, a printer, a pair of speakers, etc. The communication interface 270 may include any transceiver-like mechanism that enables the device 200 to communicate with other devices and/or systems.

Figure 3:
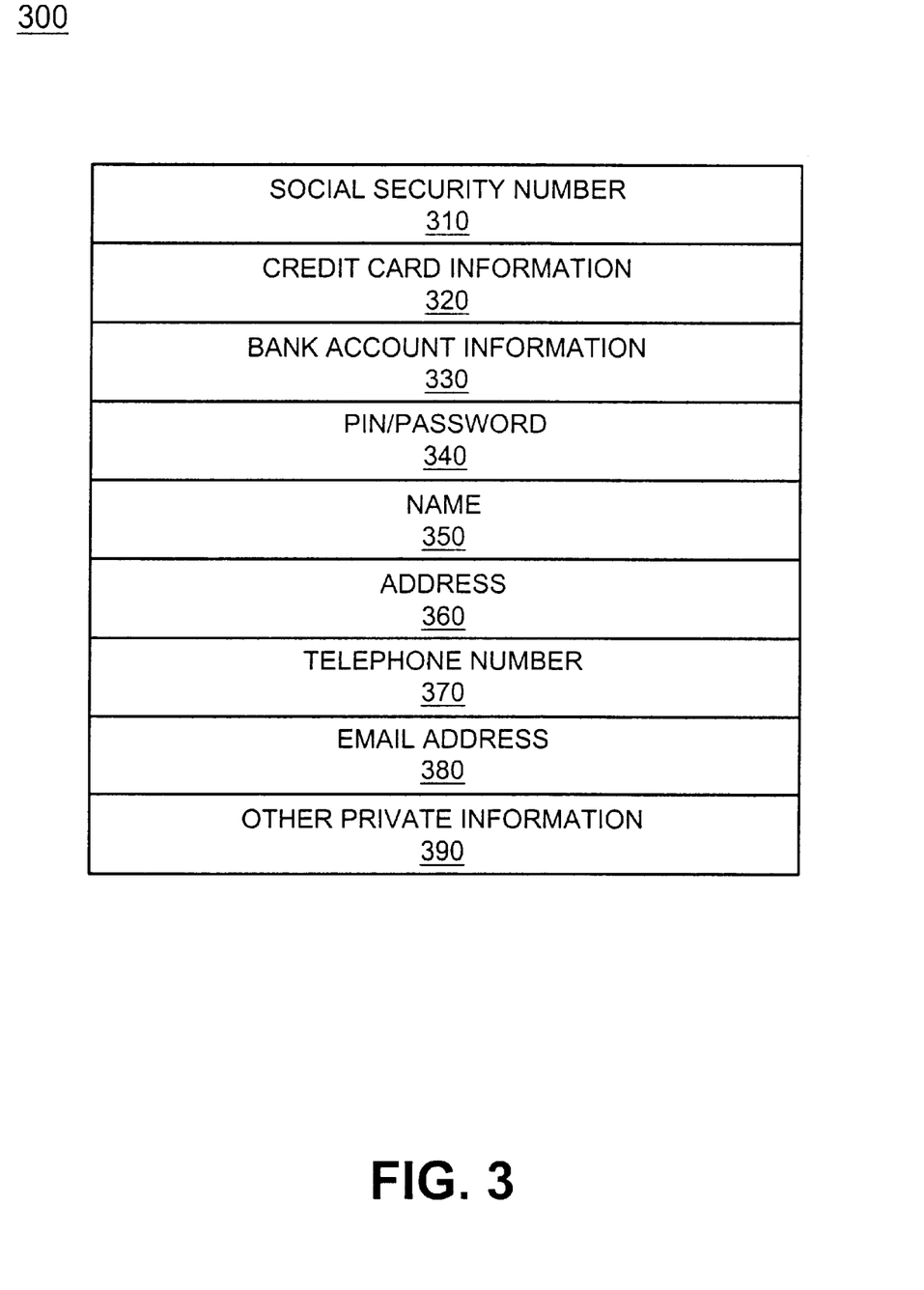
FIG. 3 is a diagram of exemplary data components stored in a memory of the device of FIG. 2.

FIG. 3 is a diagram of a memory 300 consistent with the present invention. Memory 300 is a logical entity, meaning that its contents may physically reside in a single memory device, such as memory 230 or 240 (FIG. 2), or may be distributed among memory devices. Further, the contents of the memory 300 may or may not be contiguous and may or may not be stored in encrypted form. The memory 300 may include any type of memory, computer-readable medium, or carrier wave.

The memory 300 may store several items of private information, including a social security number 310, credit card information 320, bank account information 330, a pin or password 340, a name 350, an address 360, a telephone number 370, an email address 380, and other private information 390. The other private information field 390 may include purchase history data that details a collection of purchase events and user preference data that details a user's preference for a particular type of product, service, or information. These items are merely examples and may include any other type of information that a user might consider private or confidential.

System Processing

Figure 4:
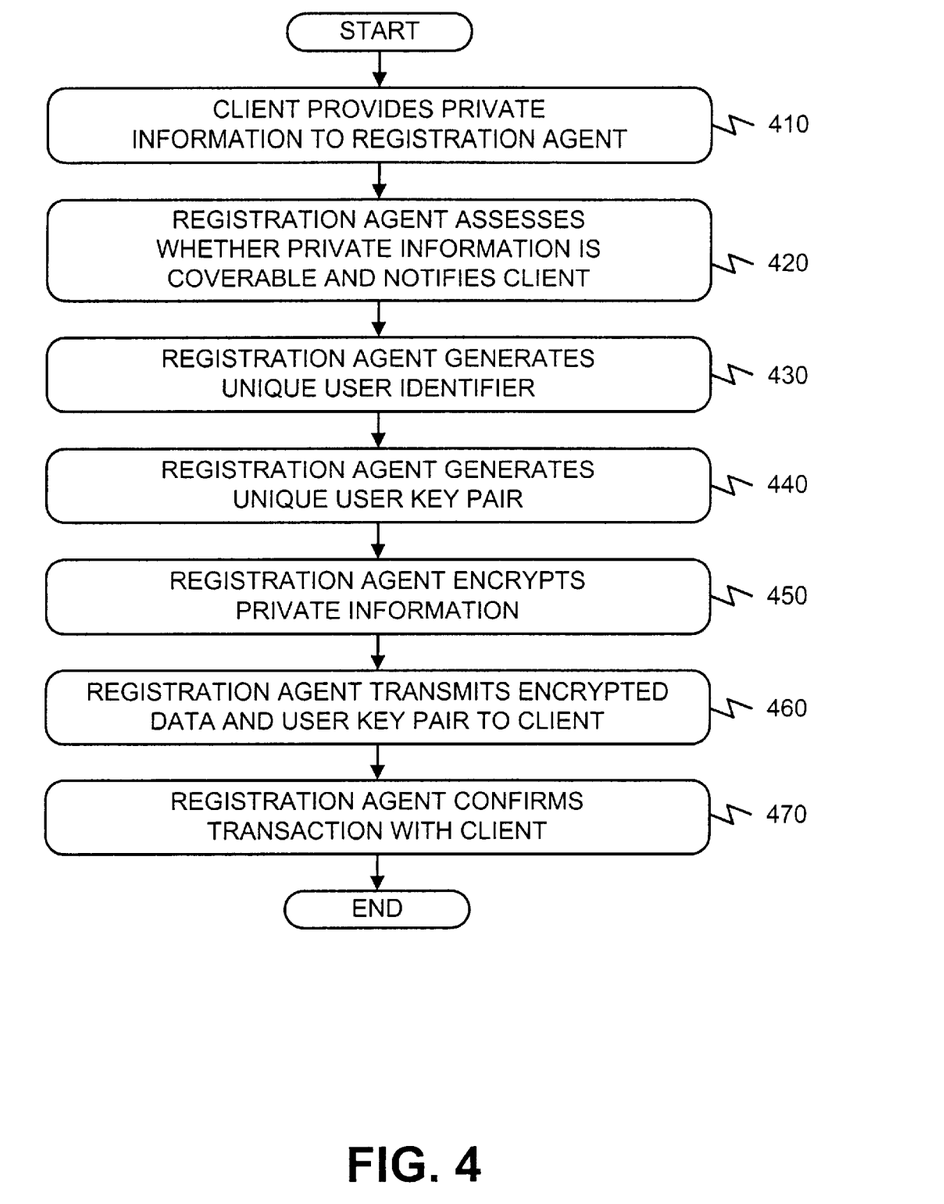
FIG. 4 is a flowchart of processing, consistent with the present invention, for registering private information of a first-time user.

FIG. 4 is a flowchart of processing, consistent with the present invention, for registering private information of a first-time user. Processing begins when a user associated with a client, such as client 110, logs into or in some other way establishes a connection with registration agent 130. The client 110 might accomplish this by entering a link or address, such as a uniform resource locator (URL), of the registration agent 130, or by establishing a direct connection with the registration agent 130. The registration agent 130 may then present the client 110 with an agreement, the terms of which the user must agree to before proceeding.

If the user agrees to the terms of the agreement, the user, via client 110, provides private information to the registration agent 130 [step 410]. The client 110 might accomplish this by requesting a user accrual page from the registration agent 130. The user accrual page might list types of information typically requested by a server operator for an eCommerce transaction, whether each type of information is within the covered domain of the registration agent 130, and the amount of the indemnity typically associated with each covered type of information. Whether a particular type of information is covered and the amount of the indemnity associated with that information may vary on a server-by-server basis.

The user would then determine which types of information to enter and provide to the registration agent 130. If the user provides information not on the list, however, the registration agent 130 assesses whether the information is coverable by a guarantee and provides the result of the assessment to the client 110 [step 420].

Upon receiving the private information, the registration agent 130 generates a unique user identifier [step 430] and a unique user key pair [step 440]. The user key pair includes a combination of private and public encryption keys used by the client 110 and the registration agent 130 to encrypt and decrypt communication between them. Instead of generating a unique user key pair, the registration agent 130 may have its own unique key pair that it uses with every client with which it communicates. Alternatively or additionally, the registration agent 130 may generate a different session key pair each time the client 110 communicates with the registration agent 130.

The registration agent 130 encrypts the private information [step 450] and provides this encrypted data with the user key pair to the client 110 [step 460]. The client 110 might store the encrypted data as a cookie (i.e., a set of data that a web site server gives to a browser the first time the user visits the site), a file, a registry key, or some other system-accessible storage mechanism. Alternatively, the registration agent 130 may store the data instead of or in combination with the client 110. In either case, the registration agent 130 may thereafter confirm the successful completion of the transaction with the client 110 [step 470].

Figure 5A:
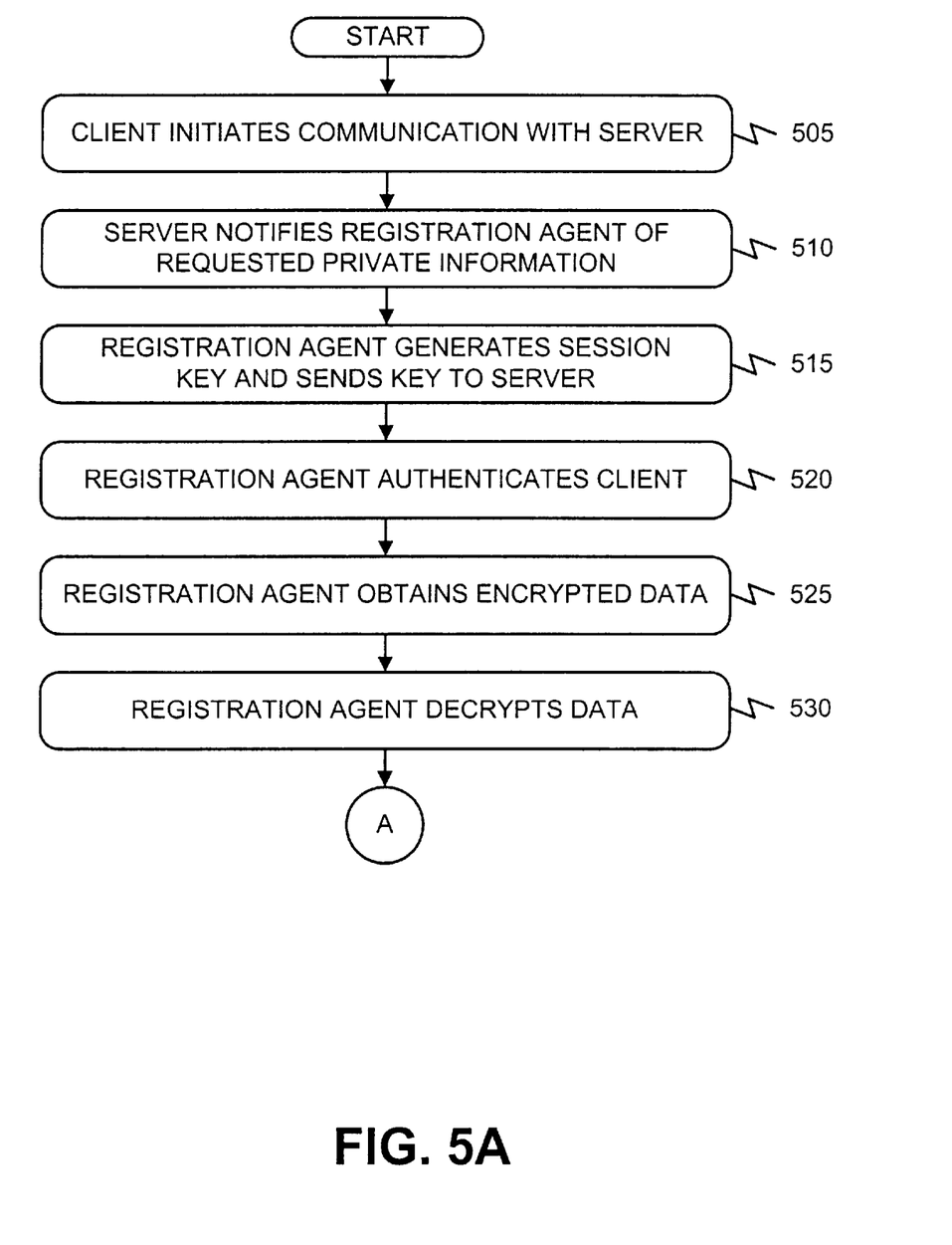
FIGS. 5A and 5B are flowcharts of processing, consistent with the present invention, for providing private information to a registered server.
Figure 5B:
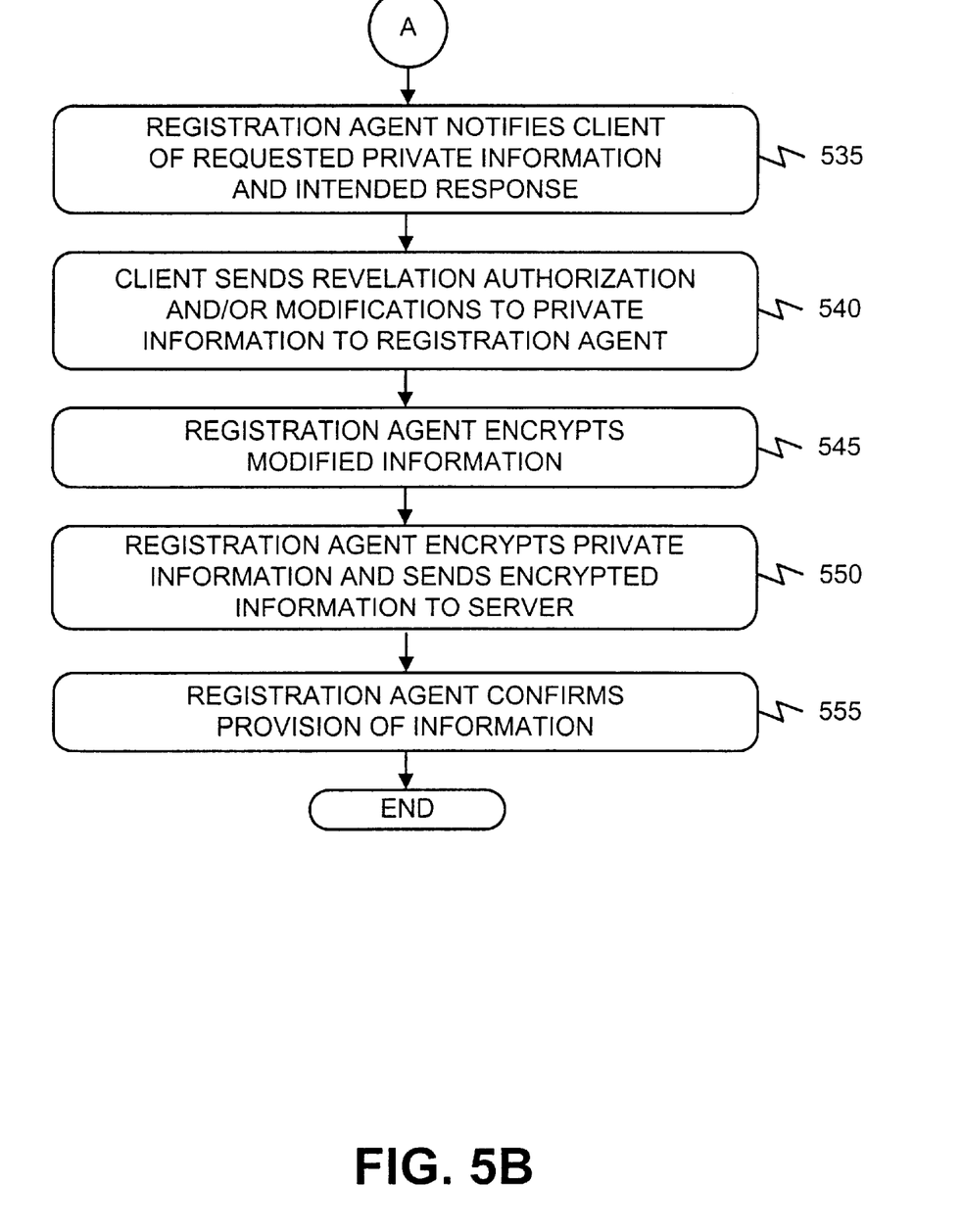

Once the user registers with the registration agent 130, the user may use the covered information when providing information (explicitly or otherwise) to a registered server, such as server 120. FIGS. 5A and 5B are flowcharts of processing, consistent with the present invention, for providing private information to a registered server 120.

In FIG. 5A, processing begins with a user associated with a client, such as client 110, browsing information of the server 120. The user might browse a web site of the server 120 to locate items, services, and/or information. If the user decides to purchase an item or service or decides to reveal the user's identity to the server 120, the user initiates communication with the server 120 [step 505]. The user might initiate communication by clicking on an icon on a web page of the server 120. Once the client 110 initiates communication, the server 120 notifies the registration agent 130 of the types of private information the server 120 requests from the user [step 510]. In one implementation consistent with the present invention, the registration agent 130 generates a session key and returns the key to the server 120 in response to the notification from the server 120 [step 515]. In another implementation, however, the registration agent 130 and the server 120 have previously exchanged encryption keys.

The client 110 then logs into the registration agent 130, possibly at the direction of the server 120. The registration agent 130 authenticates the user by verifying, for example, the user's identity [step 520]. The registration agent 130 then obtains the encrypted data (i.e., the encrypted private information) from the client 110 and/or its own storage devices [step 525]. The registration agent 130 decrypts the data to reveal the private information [step 530].

In one implementation consistent with the present invention, the registration agent 130 generates a message that includes the private information requested by the server 120 and the intended response to the server 120, and sends the message to the client 110 [step 535] (FIG. 5B). The client 110 presents the response to the user, possibly by displaying the message on a monitor. The user must then decide what information the user desires to reveal to the server 120. The user may also modify any of the information. Once finished, the user, via the client 110, sends a revelation authorization to the registration agent 130, along with any modifications to the private information [step 540]. If modifications exist, the registration agent 130 encrypts them [step 545] and sends the newly encrypted data to the client 110 and/or stores the data in its own storage devices.

The registration agent 130 thereafter encrypts the covered private information, using the session key or a previously exchanged key, and provides it to the server 120 [step 550]. The registration agent 130 may also confirm the provision of the information with the client 110 [step 555]. Once the information has been provided to the server 120, the user may complete the transaction.

Sometimes, a server 120 requests information from a user that the user has not previously registered with the registration agent 130 (i.e., "first time data"). In this case, the server 120 notifies the registration agent 130 of the requested private information. The registration agent 130 obtains the encrypted data (i.e., encrypted private information) from the client 110 and/or its own storage devices and decrypts it. The registration agent 130 then determines that first time data exists and assesses whether it is coverable by a guarantee. In this way, when the registration agent 130 provides the requested private information and intended response to the client 110, it may also provide the result of the assessment of the first time data so that the user can make an informed decision as to what information to provide to the server 120. In an alternative implementation consistent with the present invention, the server 120 assesses whether the first time data is coverable by a guarantee itself.

At other times, the user may desire to add private information to or change the information already registered with the registration agent 130. In this case, the user, via the client 110, initiates communication with the registration agent 130 and provides the new information. The registration agent 130 assesses whether the new information is coverable by a guarantee and may notify the user of the result. The user may also provide a list of recipients (e.g., servers) of the new information to the registration agent 130. The registration agent 130 would then provide the information, in encrypted form, to the recipients on the list. Under these circumstances, the registration agent 130 reissues a guarantee to each recipient with respect to the new information. This may allow, for example, a user to frequently change private information, such as a password, and automatically and securely transmit the private information to every recipient that should receive it.

Alternate System Processing

Figure 6:
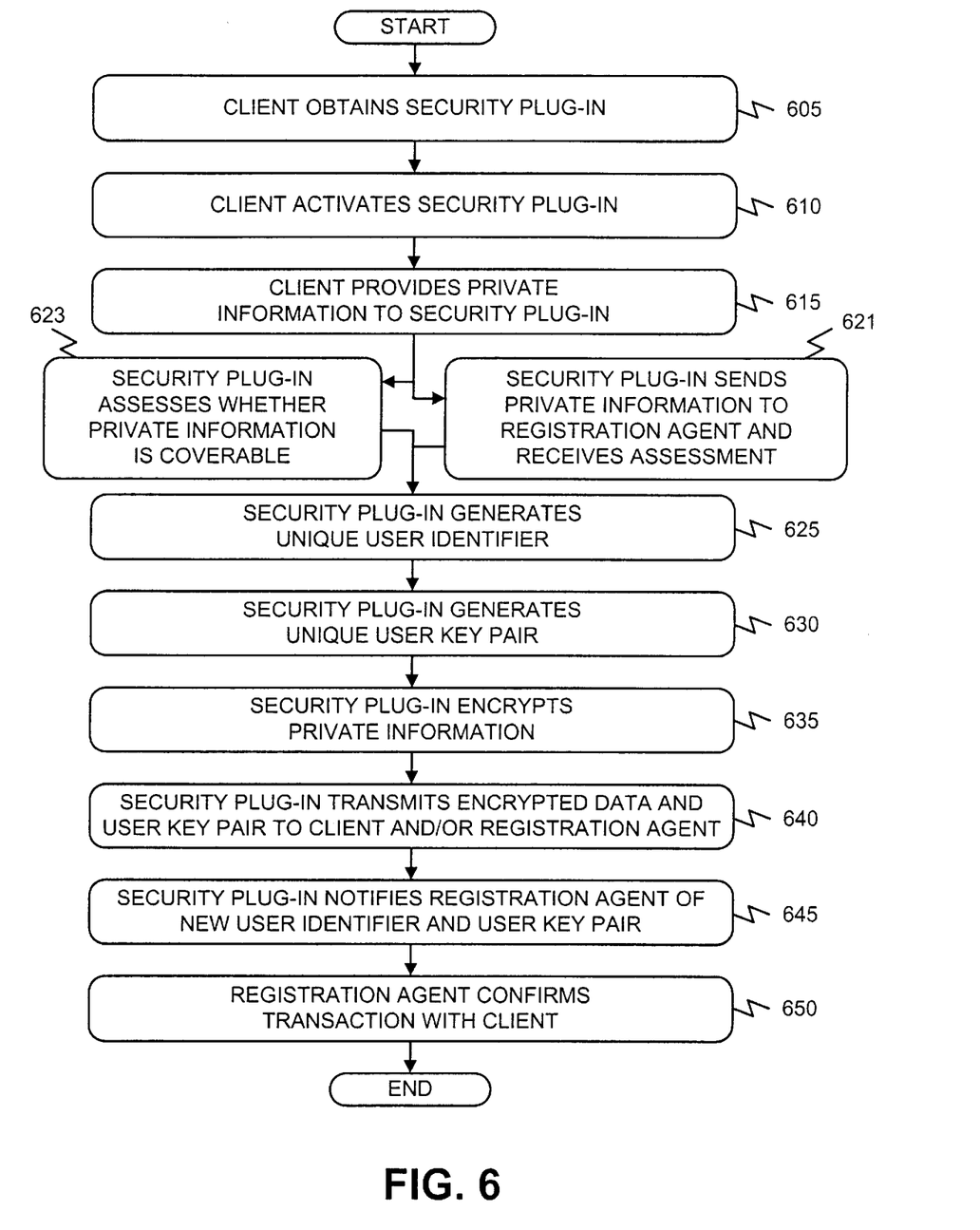
FIG. 6 is a flowchart of alternate processing, consistent with the present invention, for registering private information of a first-time user.

FIG. 6 is a flowchart of alternate processing, consistent with the present invention, for registering private information of a first-time user. Processing begins when a user associated with a client, such as client 110, logs into or in some other way establishes a connection with registration agent 130. The client 110 might accomplish this by entering a link or address of the registration agent 130 or by establishing a direct connection with the registration agent 130. The registration agent 130 may then present the client 110 with an agreement, the terms of which the user must agree to before proceeding.

If the user agrees to the terms of the agreement, the user, via client 110, obtains a security plug-in, a similar executable object, such as an applet, a dynamic link library (DLL), an external device, such as a dongle (i.e., a device that attaches to a computer to control access to a particular application) or a smart card reader, etc. [step 605]. The client 110 may obtain the plug-in from the registration agent 130 or from a third party, server, disk, tape, network, CD-ROM, etc. Alternatively, the plug-in may be pre-installed on the client 110.

The client 110 activates the plug-in [step 610] and provides to it the private information [step 615]. The client 110 might accomplish the provision of the information by requesting a user accrual page from the plug-in. The user accrual page might list types of information typically requested by a server operator for an eCommerce transaction, whether each type of information falls within the covered domain, and the amount of the indemnity associated with each covered type of information. Again, the actual amount of the indemnity may vary on a server-by-server basis.

The user would then determine which types of information to enter and provide to the plug-in. If the user provides information not on the list, however, the plug-in provides the information to the registration agent 130 to assess whether the information is coverable by a guarantee [step 621]. The registration agent 130 does so and provides the result of the assessment to the plug-in. The plug-in, in turn, may provide the result to the client 110. Alternatively, the plug-in might assess whether the information is coverable by a guarantee itself and provide its assessment to the user and/or the registration agent 130 [step 623].

Upon receiving the private information from the user, the security plug-in generates a unique user identifier [step 625] and a unique user key pair [step 630]. The plug-in then encrypts the private information [step 635] and provides this encrypted data with the user key pair to the client 110 and/or the registration agent 130 [step 640]. In alternative implementations consistent with the present invention, steps 625-640 may be performed as part of the installation process of the plug-in or when the client 110 first interacts with a server 120. As before, the client 110 might store the encrypted data as a cookie or some other system-accessible storage mechanism.

The plug-in notifies the registration agent 130 of the user identifier and possibly the user key pair [step 645]. The registration agent 130 may thereafter confirm the successful completion of the transaction with the client 110 [step 650]. In alternative implementations, steps 645 and 650 may be performed during or after a transaction with a server 120.

Figure 7A:
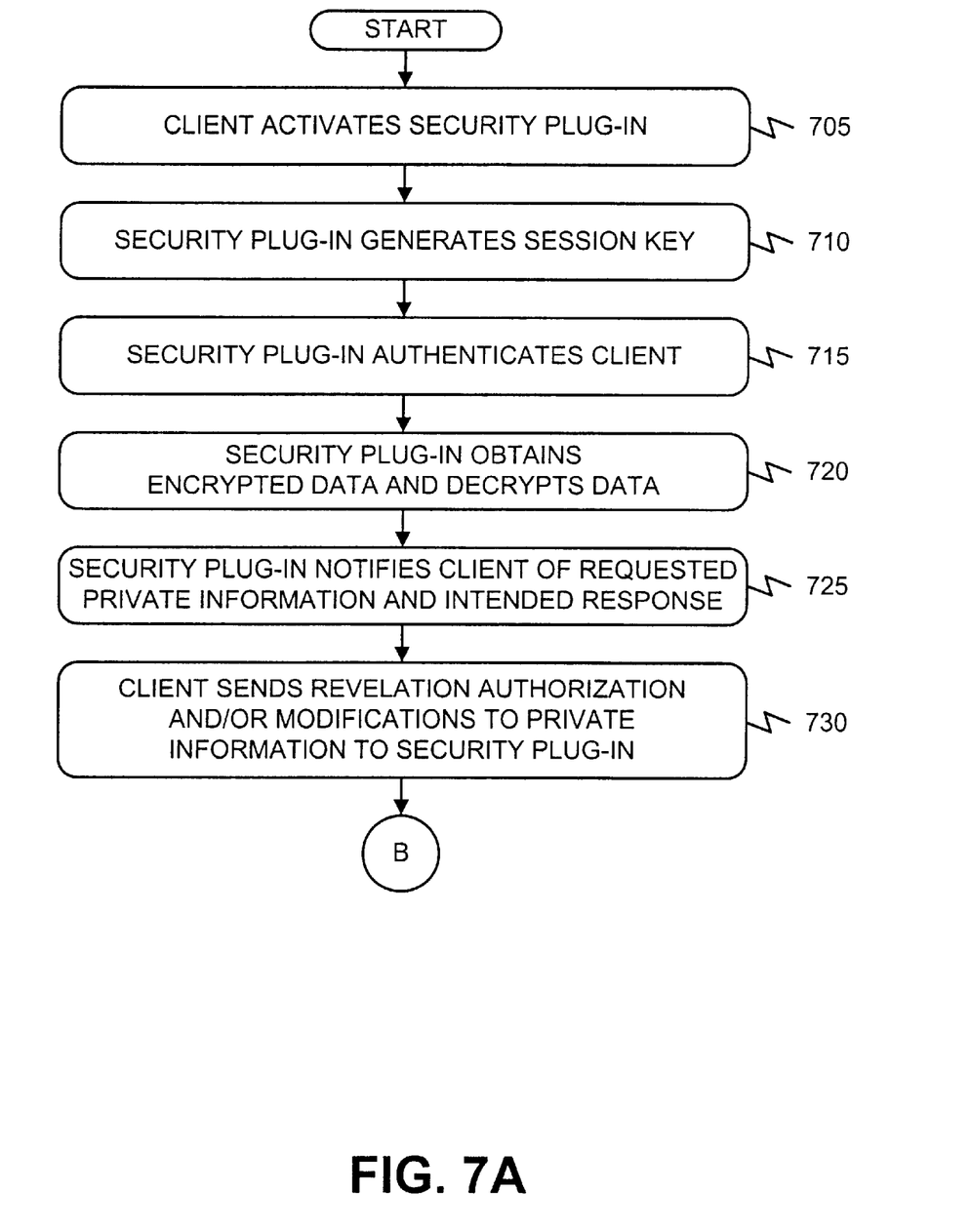
FIGS. 7A and 7B are flowcharts of alternate processing, consistent with the present invention, for providing private information to a registered server.
Figure 7B:
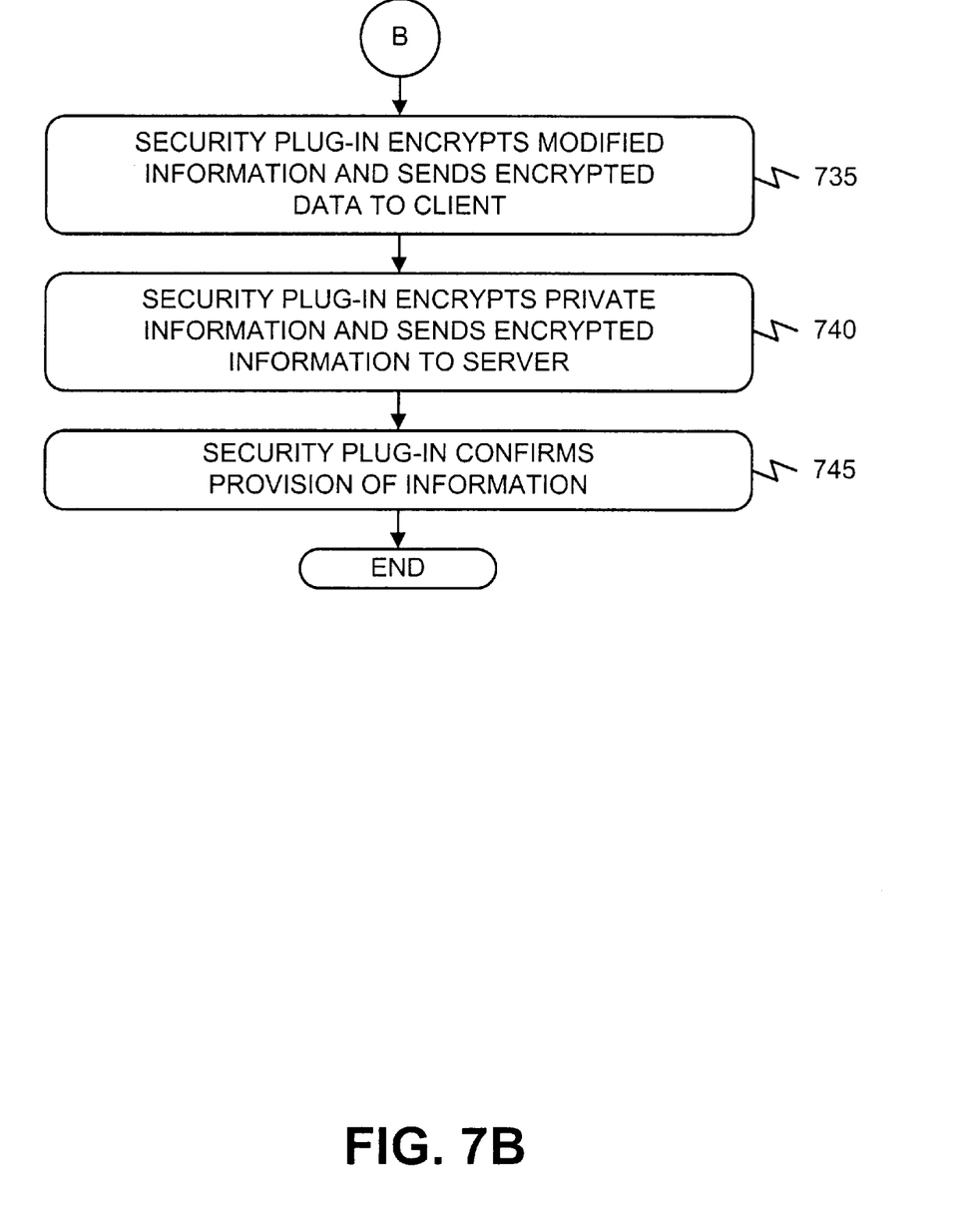

Once the user registers the private information, the user may use the covered information when providing information (explicitly or otherwise) to a registered server, such as server 120. FIGS. 7A and 7B are flowcharts of alternate processing, consistent with the present invention, for providing private information to a registered server 120.

In FIG. 7A, processing begins with a user associated with a client, such as client 110, browsing information of the server 120. The user might browse a web site of the server 120 to locate items, services, and/or information of interest. If the user decides to purchase an item or service or decides to reveal the user's identity to the server 120, the user initiates communication with the server 120. The user might initiate communication by clicking on an icon on a web page of the server 120. The initiation of communication causes the client 110 to activate the security plug-in [step 705]. In alternative implementations consistent with the present invention, the plug-in might activate itself or may be activated in response to a request from the server 120.

The security plug-in may generate a session key [step 710] and authenticate the user by verifying, for example, the user's identity [step 715]. The plug-in obtains the encrypted data (i.e., the encrypted private information) from the client 110 and/or the registration agent 130 and decrypts it to reveal the private information [step 720].

In one implementation consistent with the present invention, the plug-in generates a message that includes the private information requested by the server 120 and the intended response to the server 120, and sends the message to the client 110 [step 725]. The client 110 presents the message to the user, possibly by displaying the message on a monitor. The user must then decide what information the user desires to reveal to the server 120. The user may also modify any of the information. Once finished, the user, via the client 110, sends a revelation authorization to the security plug-in, along with any modifications to the private information [step 730]. If modifications exist, the plug-in encrypts them and sends them to the client 110 and/or the registration agent 130 [step 735] (FIG. 7B).

The security plug-in thereafter uses the session key, or another encryption key obtained from the server 120, to encrypt the requested private information and provides the encrypted information to the server 120 [step 740]. The plug-in may then confirm the provision of the information with the registration agent 130 and/or the client 110 [step 745]. Once the information has been provided to the server 120, the user may complete the transaction.

Sometimes, a server requests information from a user that the user has not previously registered (i.e., first time data). In this case, the security plug-in notifies the registration agent 130 of the presence of first time data. The registration agent 130 assesses whether the data is coverable by a guarantee and informs the plug-in of the results. Alternatively, the plug-in assesses whether the data is coverable by a guarantee itself or obtains an assessment from the server. In any event, when the security plug-in provides the requested private information and intended response to the client 110, it may also provide the result of the assessment of the first time data so that the user can make an informed decision as to what information to provide to the server 120.

At other times, the user may desire to add private information to or change the information already registered. In this case, the user, via the client 110, activates the security plug-in either directly or via the registration agent 130. The user provides the new information to the plug-in, which assesses whether the new information is coverable by a guarantee or sends the new information to the registration agent 130 for the assessment, and may notify the user of the result. The user may also provide a list of recipients of the new information to the plug-in. The plug-in would then provide the information, in encrypted form, to the recipients on the list. Under these circumstances, the registration agent 130 reissues a guarantee to each recipient with respect to the new information. This may allow, for example, a user to frequently change private information, such as a password, and automatically and securely transmit the private information to every recipient that should receive it.

Although the description with regard to FIGS. 6–7B specified certain tasks as performed by the security plug-in and certain other tasks as performed by the registration agent, these tasks are interchangeable. In other words, many of the tasks described as being performed by the security plug-in may be performed by the registration agent, and vice versa. In addition, some of the tasks described as being performed by the security plug-in and the registration agent may be performed by the client or, in some cases, the server.

Conclusion

Systems and methods consistent with the present invention protect private information provided in a business-to-business or individual-to-business transaction by guaranteeing the protection of the information, and facilitate the provision of the covered information to authorized recipients.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although a series of steps have been provided with regard to the flowcharts of FIGS. 4–7B, the order of the steps may be modified.

In addition, the preceding description identified the registration agent 130, or possibly the plug-in, as the entity that determines whether first time data provided by a client 110 is coverable by a guarantee. This need not be the case, however. In one implementation consistent with the present invention, the server 120 stores digitally-signed decisions that it previously obtained from the registration agent 130 regarding what types of information are coverable by a guarantee. In this way, when first time data is requested, the server 120 may provide an assessment of whether the data is coverable by a guarantee, in the way of a digitally-signed decision, to the client 110.

Further, in one implementation consistent with the present invention, the registration agent 130 is the entity that receives the encrypted private information from the client 110. In another implementation consistent with the present invention, the server 120 accepts the encrypted information from the client 110 and forwards it to the registration agent 130. The registration agent 130 may then assess whether the information is coverable by a guarantee. If the registration agent 130 receives any modifications to the information, the registration agent 130 encrypts them and sends them to the server 120, which, in turn, forwards them to the client 110.

The scope of the invention is defined by the claims and their equivalents.

What is claimed is:

1. A method for protecting private information provided in an exchange between a client and a server, comprising:
   receiving private information from the client;
   determining whether the private information is of a type for which a guarantee may be issued, the guarantee providing an indemnity for benefit of the client for use of the private information that is unauthorized by the client;
   issuing a guarantee for the private information determined to be of the type for which a guarantee may be issued; and
   providing the private information to the server with a guarantee.

2. The method of claim 1, further comprising:
   encrypting the private information; and
   sending the encrypted private information to the client.

3. The method of claim 2, wherein the sending includes:
   storing the encrypted private information as a cookie at the client.

4. The method of claim 1, wherein the determining includes:
   determining that a type of the private information corresponds to at least one category of information, and
   identifying an amount of the indemnity to associate with the private information based on the determined category.

5. The method of claim 4, wherein the issuing includes:
   associating the identified amount of indemnity with the private information based on the determined category.

6. The method of claim 1, wherein the receiving includes:
   receiving a request from the server for private information of the client to complete the exchange, and
   obtaining the private information from the client.

7. The method of claim 6, wherein the obtaining includes:
   generating an intended response to the request received from the server,
   providing the intended response to the client, and
   receiving authorization from the client to provide the intended response to the server.

8. The method of claim 6, wherein the obtaining includes:
   generating an intended response to the request received from the server,
   providing the intended response to the client, and
   receiving modifications to the intended response from the client.

9. The method of claim 6, wherein the obtaining includes:
   generating an intended response to the request received from the server,
   providing the intended response to the client, and
   receiving additions to the intended response from the client.

10. The method of claim 9, wherein the obtaining further includes:
    assessing whether the additions are coverable by a guarantee, and
    informing the client of a result of the assessment.

11. The method of claim 1, wherein the providing includes:
    encrypting the private information, and
    sending the encrypted information to the server.

12. The method of claim 1, wherein the receiving includes:
    transmitting an executable object to the client,
    activating the object at the client, and
    receiving the private information at the object.

13. The method of claim 1, wherein the receiving includes:
    activating an executable object at the client, and
    receiving the private information at the object.

14. The method of claim 13, wherein the receiving further includes:
    sending the private information to an external object to determine whether the private information is coverable by a guarantee.

15. The method of claim 13, wherein the determining includes:
    assessing, by the object, whether the private information is coverable by a guarantee.

16. A system for protecting private information provided in an exchange between a client and a server, comprising:
    means for receiving private information from the client;
    means for determining whether the private information is of a type for which a guarantee may be issued, the guarantee providing an indemnity for benefit of the client for unauthorized use of the private information;

means for issuing a guarantee for the private information determined to be of the type for which a guarantee may be issued; and means for providing the private information to the server with a guarantee.

17. A system for protecting private information provided in an exchange between a client and a server, comprising:

a memory that stores data; and a processor, connected to the memory, that receives private information from the client, determines whether the private information is of a type for which a guarantee may be issued, the guarantee providing an indemnity for benefit of the client for use of the private information that is unauthorized by the client, issues a guarantee for the private information determined to be of the type for which a guarantee may be issued, and provides the private information to the server with a guarantee.

18. The system of claim 17, wherein the processor is further configured to encrypt the private information and send the encrypted private information to the client.

19. The system of claim 17, wherein when determining whether the private information is of a type for which a guarantee may be issued, the processor is further configured to determine that a type of the private information corresponds to at least one category of information, and identify an amount of the indemnity to associate with the private information based on the determined category.

20. The system of claim 19, wherein when issuing a guarantee for the private information, the processor is further configured to associate the identified amount of indemnity with the private information based on the determined category.

21. The system of claim 17, wherein when receiving the private information, the processor is further configured to receive a request from the server for private information of the client to complete the exchange, and obtain the private information from the client.

22. The system of claim 21, wherein when obtaining the private information, the processor is further configured to generate an intended response to the request received from the server, provide the intended response to the client, and receive authorization from the client to provide the intended response to the server.

23. The system of claim 21, wherein when obtaining the private information, the processor is further configured to generate an intended response to the request received from the server, provide the intended response to the client, and receive modifications to the intended response from the client.

24. The system of claim 21, wherein when obtaining the private information, the processor is further configured to generate an intended response to the request received from the server, provide the intended response to the client, and receive additions to the intended response from the client.

25. The system of claim 24, wherein when obtaining the private information, the processor is further configured to assess whether the additions are coverable by a guarantee, and inform the client of a result of the assessment.

26. The system of claim 17, wherein when providing the private information, the processor is further configured to encrypt the private information and send the encrypted information to the server.

27. The system of claim 17, wherein when receiving the private information, the processor is further configured to transmit an executable object to the client and receive the private information from the object after the object is activated at the client.

28. The system of claim 17, wherein the private information includes at least one of a purchase history and preference data.

29. The system of claim 17, wherein the private information includes at least one of a social security number, credit card data, bank account data, a personal identification number, a password, a name, an address, a telephone number, and an email address.

30. The system of claim 17, wherein the memory is configured to further store a data structure including at least one of a social security number, credit card data, bank account data, a personal identification number, a password, a name, an address, a telephone number, an email address, a purchase history, and preference data corresponding to the client.

31. In a network connecting a plurality of client entities to a plurality of server entities, a registration agent, connected to the client entities and server entities, comprising:

a memory that stores instructions for determining whether private information received from one of the client entities is of a type for which a guarantee may be issued, the guarantee providing an indemnity for benefit of a user of the one client entity for use of the private information that is unauthorized by the user, issuing a guarantee for the private information determined to be of the type for which a guarantee may be issued, and providing the private information to one of the server entities with a guarantee as part of an information exchange; and a processor that executes the instructions in the memory.

32. The registration agent of claim 31, wherein the memory is further configured to store instructions for encrypting the private information and sending the encrypted private information to the one client entity.

33. The registration agent of claim 31, wherein the memory is further configured to store instructions for determining that a type of the private information corresponds to at least one category of information, and identifying an amount of the indemnity to associate with the private information based on the determined category.

34. The registration agent of claim 33, wherein the memory is further configured to store instructions for associating the identified amount of the indemnity with the private information based on the determined category.

35. The registration agent of claim 31, wherein the memory is further configured to store instructions for obtaining the private information from the one client entity in response to a request received from the one server entity for private information of the user to complete the exchange.

36. The registration agent of claim 35, wherein the memory is further configured to store instructions for generating an intended response to the request received from the one server entity, providing the intended response to the one client entity, and providing the intended response to the one server entity when authorized by the one client entity.

37. The registration agent of claim 35, wherein the memory is further configured to store instructions for generating an intended response to the request received from the one server entity, providing the intended response to the one client entity, and issuing a guarantee for modifications to the intended response received from the one client entity.

38. The registration agent of claim 35, wherein the memory is further configured to store instructions for generating an intended response to the request received from the one server entity, providing the intended response to the one client entity, assessing whether additions to the intended response received from the one client entity are coverable by a guarantee, and informing the one client entity of a result of the assessment.

39. The registration agent of claim 31, wherein the memory is further configured to store instructions for encrypting the private information and sending the encrypted information to the one server entity.

40. An executable object within a computer device communicating with a client entity and a plurality of server entities, the executable object comprising:
   instructions for obtaining private information from a user associated with the client entity for use in an information exchange with one of the server entities;
   instructions for sending the private information to an external object to obtain an assessment of whether the private information is coverable by a guarantee, the assessment indicating whether an indemnity will be paid to the user when the private information is used in a manner unauthorized by the user;
   instructions for obtaining the assessment from the external object; and
   instructions for providing the private information to the one server entity with a guarantee.

41. The executable object of claim 40, further comprising:
   instructions for encrypting the private information; and
   instructions for storing the encrypted private information as an object on the client entity.

42. The executable object of claim 40, further comprising:
   instructions for generating an intended response to a request received from the one server entity for private information of the user;
   instructions for providing the intended response to the client entity; and
   instructions for providing the intended response to the one server entity when authorized by the client entity.

43. The executable object of claim 40, further comprising:
   instructions for generating an intended response to a request received from the one server entity for private information of the user;
   instructions for providing the intended response to the client entity; and
   instructions for issuing a guarantee for modifications to the intended response received from the client entity.

44. The executable object of claim 40, further comprising:
   instructions for generating an intended response to a request received from the one server entity for private information of the user;
   instructions for providing the intended response to the client entity;
   instructions for obtaining an assessment of whether additions to the private information from the external object are coverable by a guarantee; and
   instructions for informing the client entity of a result of the assessment.

45. The executable object of claim 40, further comprising:
   instructions for encrypting the private information; and
   instructions for sending the encrypted information to the one server entity.

46. A computer-readable medium storing instructions for causing a processor to perform a method, the method comprising:
   determining whether private information received from a client object is of a type for which a guarantee may be issued, the guarantee providing an indemnity for benefit of a user associated with the client object for unauthorized use of the private information;
   issuing a guarantee for the private information determined to be of the type for which a guarantee may be issued; and
   providing the private information to a server object with a guarantee as part of an information exchange.

47. A computer-readable medium storing instructions for causing a processor to perform a method, the method comprising:
   obtaining private information from a client object for use in an exchange with a server object;
   sending the private information to a registration object to obtain an assessment of whether the private information is coverable by a guarantee, the assessment indicating whether an indemnity will be paid to a user associated with the client object when the private information is used in a manner unauthorized by the user; and
   providing the private information to the server object with a guarantee.

48. An executable object within a computer device communicating with a client entity and at least one server entity, the executable object comprising:
   instructions for obtaining private information from a user associated with the client entity;
   instructions for assessing whether the private information is coverable by a guarantee, the assessment indicating whether an indemnity will be paid to the user when the private information is used in a manner that is unauthorized by the user; and
   instructions for providing the private information to the server entity with a guarantee.

49. A system for providing private information of a client to a server during an information exchange, comprising:
   a memory that stores data; and
   a processor, connected to the memory, that receives a request for private information of the client from the server, generates an intended response to the request, the intended response including the requested private information with a guarantee, the guarantee providing an indemnity for benefit of the client for use of the private information in a manner unauthorized by the client, provides the intended response to the client, receives authorization from the client to send the intended response to the server, and sends the intended response to the server in response to the received authorization.

50. A method for providing privacy in a transaction, comprising:
   providing at least one of information, services, and products for browsing and purchase by consumers during a transaction;
   requesting private information from the consumers prior to completing the transaction;
   receiving the requested information with a guarantee, the guarantee providing an indemnity for benefit of the consumers for unauthorized use of the requested information; and
   completing the transaction.

51. The method of claim 50, wherein the guarantee includes at least one of a commitment, a contract, and a surety bond.

52. The method of claim 50, wherein the guarantee includes a surety bond.

53. A method for protecting private information in a transaction, comprising:

providing at least one of information, services, and products for browsing and purchase by a consumer during a transaction;

requesting private information from the consumer prior to completing the transaction, the private information having an associated guarantee, the guarantee providing an indemnity for benefit of the consumer for use of the private information in a manner that is unauthorized by the consumer; and completing the transaction.

54. The method of claim 53, wherein the guarantee includes at least one of a commitment, a contract, and a surety bond.

55. The method of claim 53, wherein the guarantee includes a surety bond.

56. A system that protects private information of consumers obtained during transactions with the consumers, comprising:

a processor configured to:

provide at least one of information, services, and products for browsing and purchase by consumers, obtain private information from the consumers prior to completing the transactions with the consumers, the private information having an associated guarantee, the guarantee providing an indemnity for benefit of the consumers for use of the private information in a manner that is unauthorized by the consumers, and complete the transaction; and a memory configured to store at least some of the private information.

57. The system of claim 56, wherein the guarantee includes at least one of a commitment, a contract, and a surety bond.

58. The system of claim 56, wherein the guarantee includes a surety bond.

59. A method for protecting private information in a transaction, comprising:

providing at least one of information, services, and products for browsing and purchase by a consumer during a transaction;

requesting private information from the consumer prior to completing the transaction;

associating a guarantee with the private information, the guarantee providing an indemnity for benefit of the consumer for use of the private information in a manner that is unauthorized by the consumer; and completing the transaction.

60. A method for protecting private information provided by a client to a server, comprising:

identifying private information of the client;

associating a guarantee with the private information, the guarantee providing an indemnity for benefit of the client for use of the private information that is unauthorized by the client; and providing the private information to the server with the associated guarantee.

61. The method of claim 60, wherein the guarantee includes at least one of a commitment, a contract, and a surety bond.

62. The method of claim 60, wherein the guarantee includes a surety bond.

63. A system for protecting private information provided by a client to a server, comprising:

means for identifying private information from the client;

means for associating a guarantee with the private information, the guarantee providing an indemnity for benefit of the client for use of the private information that is unauthorized by the client; and means for informing the server of the private information and the associated guarantee.

64. The system of claim 63, wherein the guarantee includes at least one of a commitment, a contract, and a surety bond.

65. The system of claim 63, wherein the guarantee includes a surety bond.

* * * * *